United States Patent
Schütt et al.

(10) Patent No.: US 6,467,832 B2
(45) Date of Patent: Oct. 22, 2002

(54) CONVERTIBLE MOTOR VEHICLE DOOR

(75) Inventors: Thomas Schütt, Fürstenfeldbruck; Stefan Miklosi, München, both of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/761,859

(22) Filed: Jan. 18, 2001

(65) Prior Publication Data

US 2001/0024050 A1 Sep. 27, 2001

(30) Foreign Application Priority Data

Jan. 18, 2000 (DE) .......................................... 100 01 958

(51) Int. Cl.$^7$ ................................................. B60J 7/20
(52) U.S. Cl. .............................. 296/107.08; 296/107.17
(58) Field of Search ........................ 296/107.17, 107.08, 296/107.01, 136, 37.16, 37.5, 37.1

(56) References Cited

U.S. PATENT DOCUMENTS

| | | | |
|---|---|---|---|
| 2,596,355 A | * 5/1952 | Ackermans | 296/107.18 |
| 4,776,630 A | * 10/1988 | Fukutomi et al. | 296/107.17 |
| 4,796,943 A | * 1/1989 | Fukutomi et al. | 296/107.17 X |
| 4,969,679 A | * 11/1990 | Eyb | 296/124 |
| 5,195,798 A | * 3/1993 | Klein et al. | 296/107.17 X |
| 5,209,544 A | * 5/1993 | Benedetto et al. | 296/107.08 X |
| 5,265,930 A | * 11/1993 | Klein et al. | 296/107.17 |
| 5,542,735 A | 8/1996 | Fürst et al. | |
| 5,649,733 A | * 7/1997 | Seel et al. | 296/136 |
| 5,769,483 A | 6/1998 | Danzl et al. | |
| 5,967,591 A | * 10/1999 | Muehlhausen | 296/107.17 X |
| 5,979,970 A | * 11/1999 | Rothe et al. | 296/107.17 |
| 6,053,560 A | * 4/2000 | Rothe | 296/107.17 X |
| 6,199,936 B1 | * 3/2001 | MacFarland | 296/107.08 X |

FOREIGN PATENT DOCUMENTS

| | | | |
|---|---|---|---|
| DE | 42 03 229 | 8/1993 | |
| DE | 43 26 255 | 9/1994 | |
| DE | 44 35 222 | 11/1995 | |
| DE | 196 36 209 | 12/1997 | |
| DE | 197 06 417 | 7/1998 | |
| EP | 0 261 379 | 3/1988 | |
| EP | 0 641 683 | 3/1995 | |
| JP | 62-120218 | * 6/1987 | 296/107.17 |
| JP | 62-120220 | * 6/1987 | 296/107.17 |
| JP | 62-120224 | * 6/1987 | 296/107.17 |

* cited by examiner

Primary Examiner—D. Glenn Dayoan
Assistant Examiner—Patricia Engle
(74) Attorney, Agent, or Firm—Nixon Peabody LLP; David S. Safran

(57) ABSTRACT

A convertible roof for a motor vehicle with a front roof element (3) and a rear roof element (4), which are supported to pivot on the body by a respective lever arrangement and can be deposited in a stowage space (6) which can be covered by a pivotable cover (7) of the stowage space. The front roof element (3) and the rear roof element (4) are deposited essentially in a vertical arrangement in the stowage space (6) for the roof elements. The cover (7) of the stowage space (6) for the roof elements is pivotally mounted on the body and can swing upward out of its cover position with the rear element (4) closed.

13 Claims, 8 Drawing Sheets

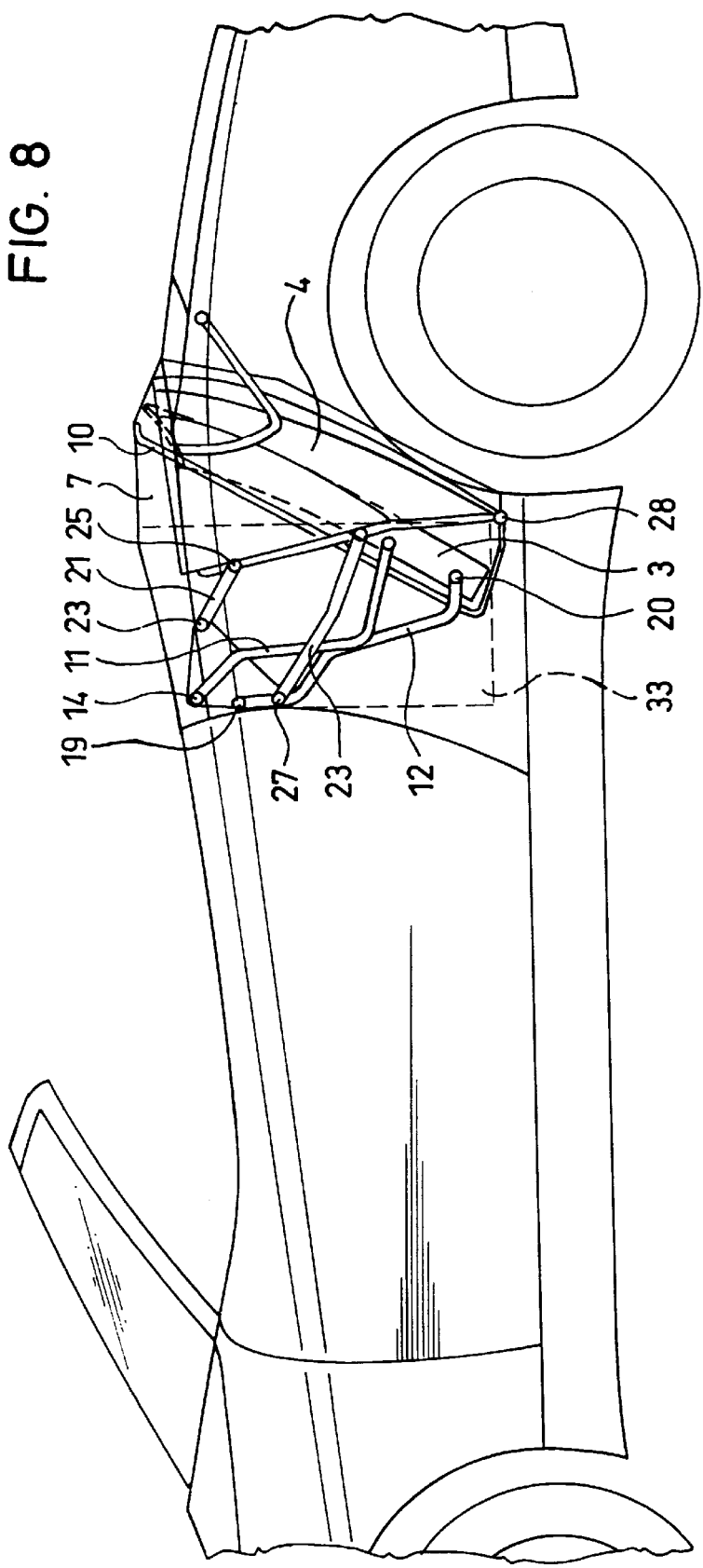

CONVERTIBLE MOTOR VEHICLE DOOR

BACKGROUND OF THE INVENTION

1. Field of the Invention

The invention relates to a convertible motor vehicle roof with a front roof element and a rear roof element which are pivotally mounted by lever means on the body and which can be deposited in a stowage space which can be covered by a pivoting cover of the stowage space.

2. Description of Related Art

German Patent DE 44 35 222 C15 and corresponding U.S. Pat. No. 5,769,483 disclose a motor vehicle roof with a front roof element and a rear roof element in which the roof element, which can be locked on the apron via pivotally coupled roof rods, is pivotably coupled to the body by means of a pivot lever. The rear roof element, which rearwardly adjoins the front roof element, sits on the cover flap of the stowage box for the convertible roof to form a seal and forms the transition to the trunk. The rear roof element is movably supported, via a pivot lever which is supported on the body and which can be pivoted by means of a hydraulic cylinder, and is coupled via another hydraulic cylinder to a rear coupling point of the rear element to the hydraulic cylinder, and with an additional hydraulic cylinder and a telescoping guide parallel to it, can be raised out of its closed position by the flap of the box for the convertible top and can be pivoted forward to over the front roof element by pivoting and actuating the lever and hydraulic cylinder. The additional hydraulic cylinder and the telescoping guide are, on the one hand, attached to the pivot lever, and on the other, engage the rear element on the front coupling point. Since the rear element has been locked on the roof element and the roof rod has been unlocked, by actuating the lever and the hydraulic cylinder means, the rear roof element is swung as a unit with the front roof element to the rear into a stowage space and is deposited therein essentially horizontally. In doing so, the front roof element pivots according to a guide by its pivot rod and by the lever and hydraulic cylinder means of the rear element. However, this horizontal deposition of the front roof element and the rear roof element requires a large stowage space which extends into the trunk and makes the latter smaller.

German Patent 43 26 255 and corresponding U.S. Pat. No. 5,542,735 disclose a hardtop convertible motor vehicle in which, in the fully open configuration, stows the roof parts in a substantially vertical orientation in a stowage space between the rear seat backs and the wheel well. However, this arrangement is very complex, the rear roof element being composed of a rear roof part and a pair of side window panel members, the rear roof part sliding forward into the front roof element for lowering with it, while the side window panel members are swung down separately in advance of joint lowering of the rear roof part with the front roof element.

SUMMARY OF THE INVENTION

A primary object of the invention is to provide the initially mentioned motor vehicle roof with an improved and simplified lowering mechanism for achieving a space-saving deposition of the roof in a stowage space.

This object is achieved in accordance with the invention in that front roof element and the rear roof element are deposited separately moved into the stowage space where they are positioned in an essentially vertical arrangement. This space-saving arrangement of the deposited motor vehicle roof or folding roof does not limit the volume of the trunk. Furthermore, due to the roughly vertical alignment of the lowered motor vehicle roof in the corresponding vertical stowage space for the roof elements, a cargo space provided directly behind the seats remains accessible from above, even with the vehicle roof deposited. Moreover, by providing a respective lowering mechanism for each of the front and rear roof elements, the rear roof element can be made of as a single unit that does not have to be broken down into roof and side window parts before it can be stowed.

Preferably, the rear element with the roof element closed can be deposited in the stowage space for the folding roof so that it can be operated when driving with the motor vehicle roof partially open. Here, the rear element can be deposited and also removed independently of the roof element in order to close the motor vehicle roof again. In one feasible configuration, the cover of the stowage space for the folding roof, which is pivotally mounted on the body, can be swung upward from its closed position with the rear roof element closed, enabling a simple sequence of motions when the rear roof element is deposited.

Preferably. the lever means which supports the front roof element contains two levers which form a four-bar mechanism. Depending on the chosen positions of the joints of the two levers, the pivoting motion of the front roof element can be easily dictated and adjusted. In a comparable configuration, the lever means which supports the rear roof element can have two rods which form a four-bar mechanism.

A configuration is especially preferred according to which, with the motor vehicle roof closed, the lever means or the levers of the roof element are located essentially vertically roughly in the area of a side front edge of the rear roof element which borders the door window frame or a frameless door window. By means of this arrangement, an unobstructed view through the side window located in the rear element is not adversely affected at all or is only slightly impaired. When the rear element is opened or deposited, in this partially open position, the levers are laterally in an arrangement which essentially does not obstruct vision towards the rear of the vehicle and especially obliquely to the rear.

When the stowage space for the convertible roof elements, which is located behind the seats of the motor vehicle roof, is bordered towards the seats by a pivoting inside cover, access to the stowage space for the roof elements being opened for depositing the motor vehicle roof by pivoting the inside cover forward in the direction towards the seats to the required degree.

When the inside cover is made at least partially flexible, a cargo space provided directly behind the seats can be widened into the stowage space for the folding roof with the motor vehicle roof closed without the inside cover having to be removed.

Preferably, the two lever means are designed such that first the rear element and then the front roof element are deposited in the stowage space for the roof elements for complete opening of the motor vehicle roof after the cover of the stowage space has been swung up and the inside cover is swung forward.

Feasibly, the roof element and the rear element each contain its own drive, but there can also be a drive means with a fixed sequence of motions for the roof element and the rear element.

For easy and still reliable attachment of the joints which support the levers and rods on the body side, it can be provided that they are located on a bearing plate on the body.

One embodiment of the invention is explained in detail below with reference to the drawings.

BRIEF DESCRIPTION OF THE DRAWING

FIG. 8 is a side view of the deposited motor vehicle in the fully open position.

DETAILED DESCRIPTION OF THE INVENTION

Figure 1:
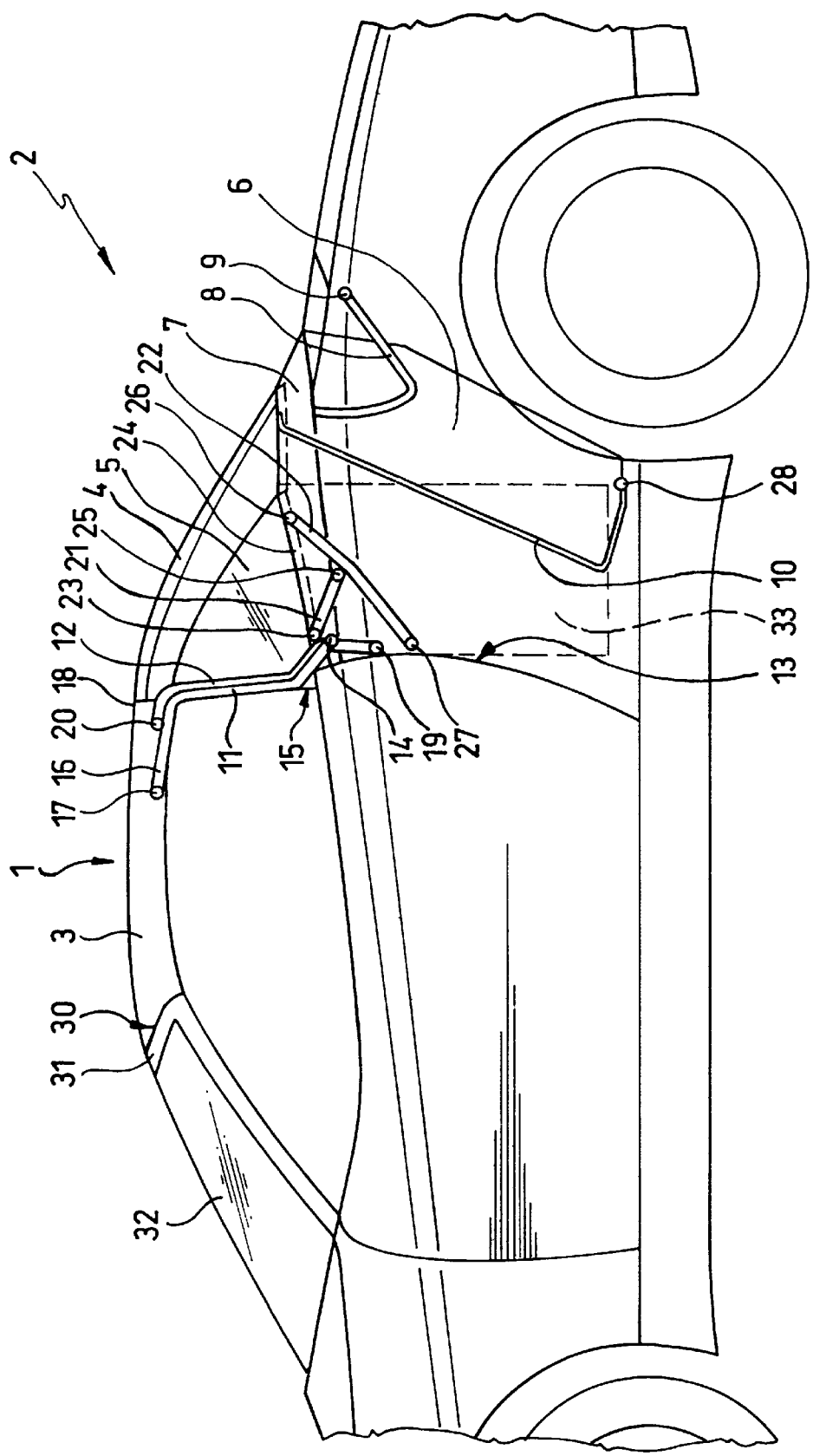
FIG. 1 is a side view schematically representing a convertible hardtop motor vehicle roof in the closed position.

The motor vehicle roof 1 of a convertible automobile 2 is made as a convertible hardtop having a rigid front roof element 3 and a rigid rear roof element 4 which can contain a rear window 5. The motor vehicle roof 1 can be converted into an open-top configuration by the front roof element 3 and the rear roof element 4 being deposited essentially vertically in a stowage space 6 for the folding roof which is located behind the seats and in front of the trunk, i.e., between the wheel well for the rear wheels and the rear seats. The cover 7 of the stowage space 6 is supported on the body via a rod 8 having a rear pivot joint 9 and laterally surrounds the lower edge of the rear roof element 4 to the rear in somewhat of a U-shape. The cover 7 is able to be fold up from its closed position in which it covers the stowage space 6 with the motor vehicle roof 1 closed and in which it tightly adjoins the lower edge of the rear element 4 (the motor vehicle roof is described using the bearing means which are on the left side relative to the vehicle and which face the viewer, and of course, the opposing right motor vehicle side has the corresponding bearing means). An inside cover 10 which borders the stowage space 6 for the roof elements towards the seats is pivotally mounted on a lower swivel joint 28 in the area of the bottom of the body. With the motor vehicle roof 1 closed (see FIG. 1) the inside cover 10 on the inside adjoins the lower bottom edge of the rear element 4. The inside cover 10 can have a rigid plate or a rigid frame with a flexible covering.

The front roof element 3 is supported to be able to pivot on the vehicle by a lever means which is located within the motor vehicle roof 1 and which has two levers 11 and 12 which form a four-bar mechanism. The first lever 11 of the lever means is supported in the area of the rear door frame 13 inside on the body in a lower joint 14, and in the closed position of the vehicle roof 1, the first lever is aligned essentially vertically along a front side edge 15 of the rear roof element 4, the lever 11 being located on the inside of the rear roof element 4, for example, behind a door seal which is attached to the front side edge 15 of the rear element 4 for a side door window. The top end section 16 of the lever 11 is angled forward along the upper door seal on the side edge of the front roof element 3 and extends as far as a joint 17 which is spaced away from the rear edge 18 of the front roof element 3.

Figure 4:
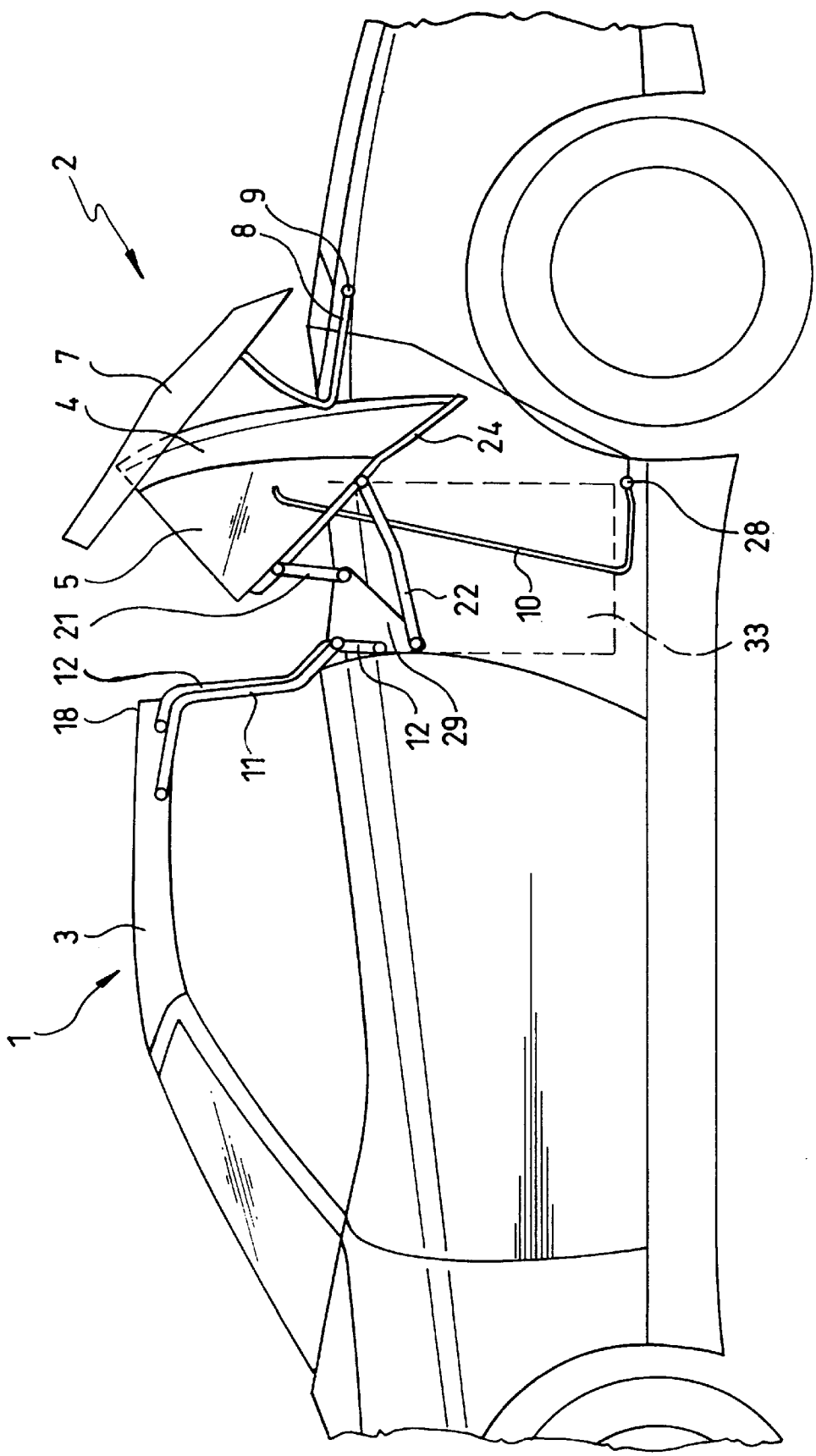
FIG. 4 is a side view of the motor vehicle roof when its rear roof element is being stowed.

The second lever 12 of the lever means is supported on a lower joint 19 which is located laterally on the body roughly underneath the lower joint 14 of the first lever 11. The second lever 12 extends roughly next to the first lever 11, upward as far as a joint 20 in the area of the rear edge 18 of the front roof element 3. The positions of the joints 14, 17 & 19, 20 of the levers 11 and 12 are chosen according to the dynamic behavior which can be achieved by a four-bar arrangement. The two lower joints 14, 19 can be attached to a body-mounted bearing part 29, for example, a bearing plate (FIG. 4).

The rear element 4 is supported to pivot via a lever means with two rods 21, 22 which are supported in the four-bar arrangement. The first rod 21 is supported on a joint 23 in the front area on the side lower edge 24 of the rear element 4 and on a joint 25 which is located on the body. The second rod 22, on the one hand, is supported on a joint 26 in the rear area on the side lower edge 24 of the rear element 4, and on the other hand, on a joint 27 on the body in the area of the rear door frame 13, underneath the joint 19 of the second lever 12 of the roof element 3.

Figure 2:
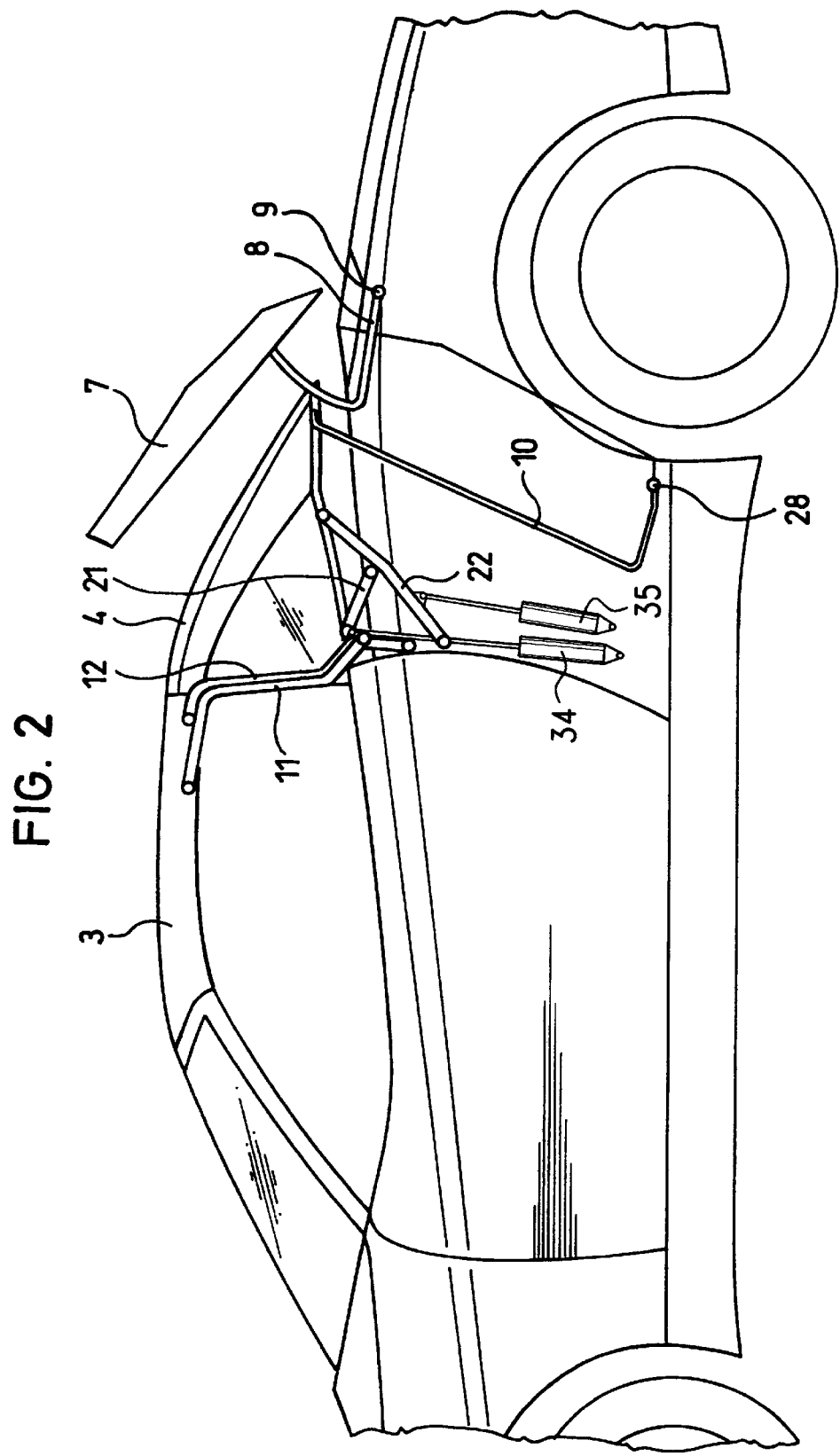
FIG. 2 is a side view of the motor vehicle roof with the cover of the stowage space for the roof swung up.
Figure 3:
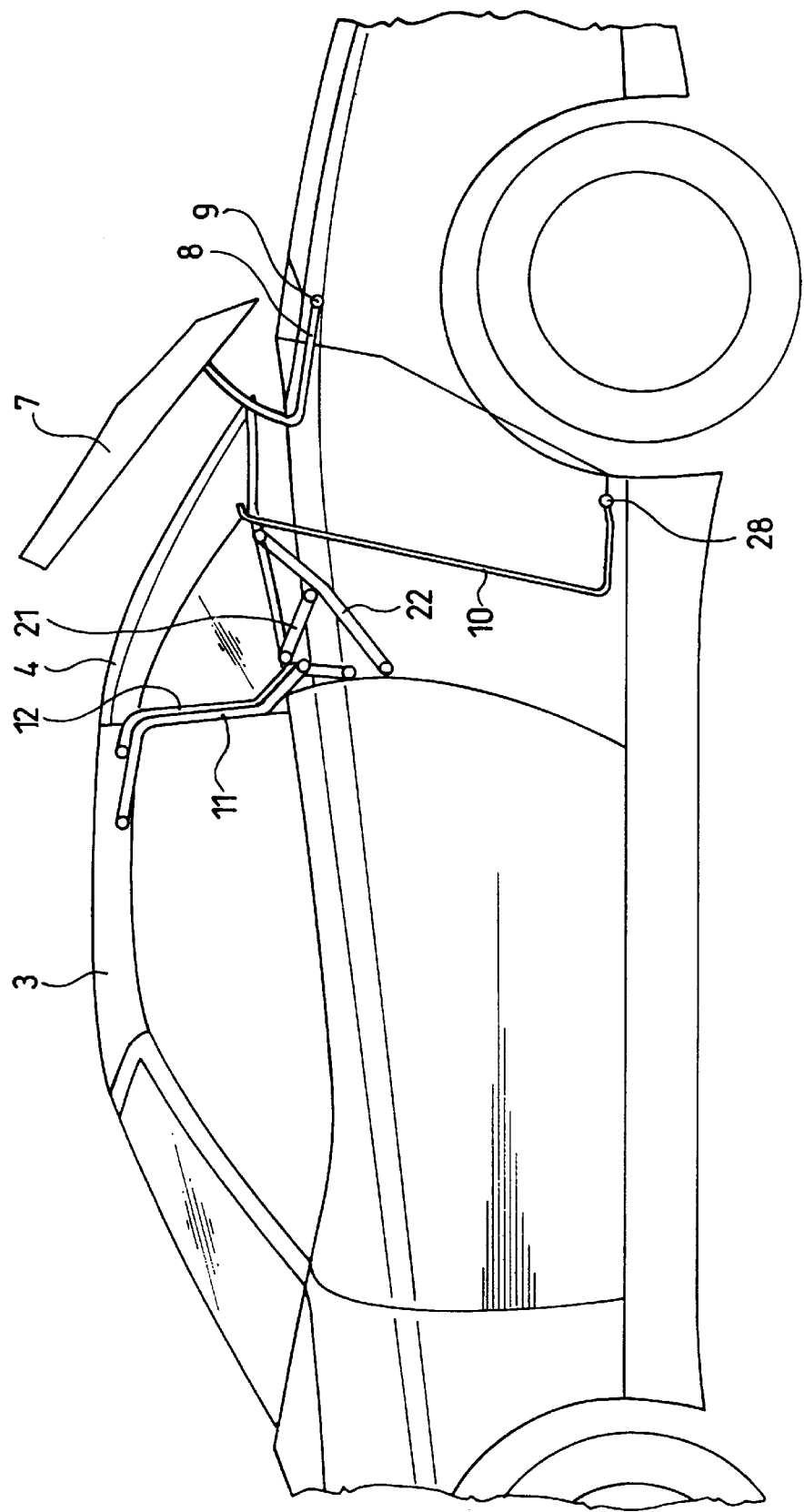
FIG. 3 is a side view of the motor vehicle roof with the inside cover of the stowage space for the roof pivoted forward.
Figure 5:
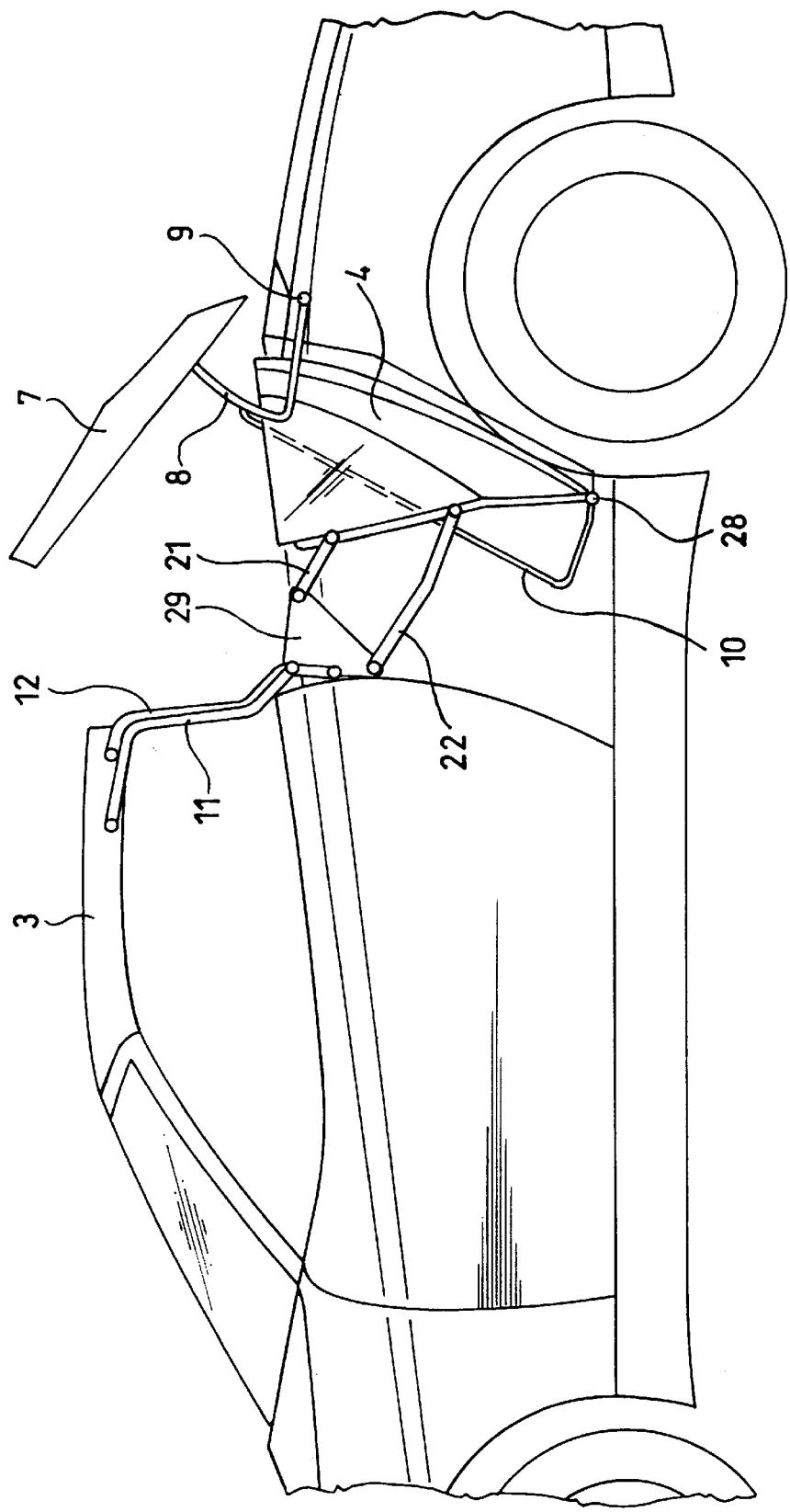
FIG. 5 is a side view of the motor vehicle roof with the rear element deposited in the stowage space for the roof.
Figure 6:
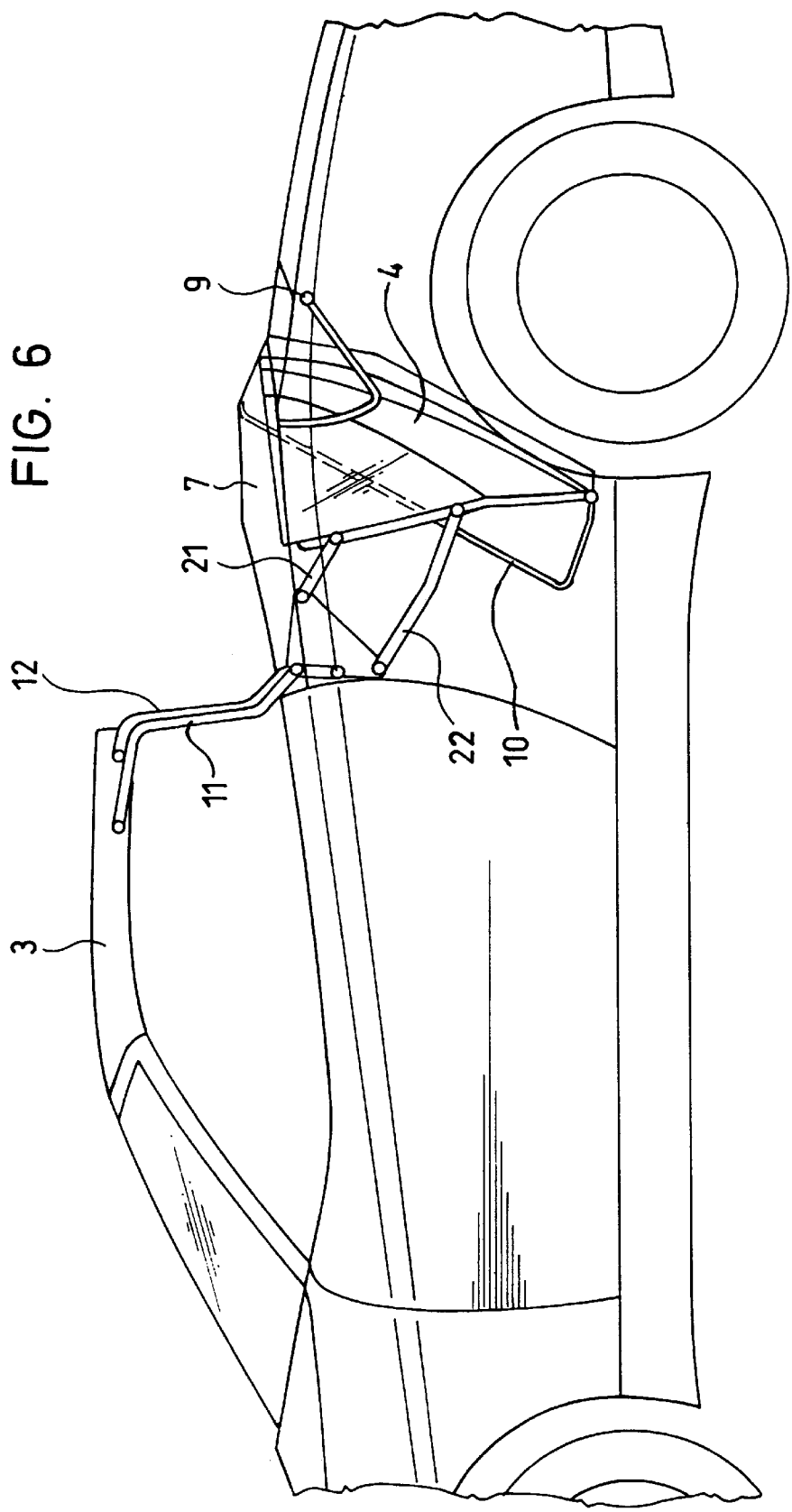
FIG. 6 is a side view of the motor vehicle roof in a partially open position.

To open the vehicle roof 1, the cover 7 of the stowage space is swung up by a drive (not shown) around its joint 9 (FIG. 2) and the inside cover 10 of the stowage space 6 for the roof elements is pivoted forward in the direction toward the seats so that the stowage space 6 for the roof elements is opened towards the top (FIG. 3). Then, the rear element 4 is pivoted from its closed position to the rear and down into the stowage space 6 (FIG. 4) by a drive, such as by a piston and cylinder unit 35 connected to lever 22, and deposited roughly in a vertical orientation (FIG. 5). The inside cover 10 is pivoted back into its initial position. After swinging down the cover 7 of the stowage space into its initial position on the body, which covers the stowage space 6 (FIG. 6), the motor vehicle roof 1 is in the partially open position ready to drive, in which the rear element 4 has been deposited in the stowage space 6 for the folding roof.

Figure 7:
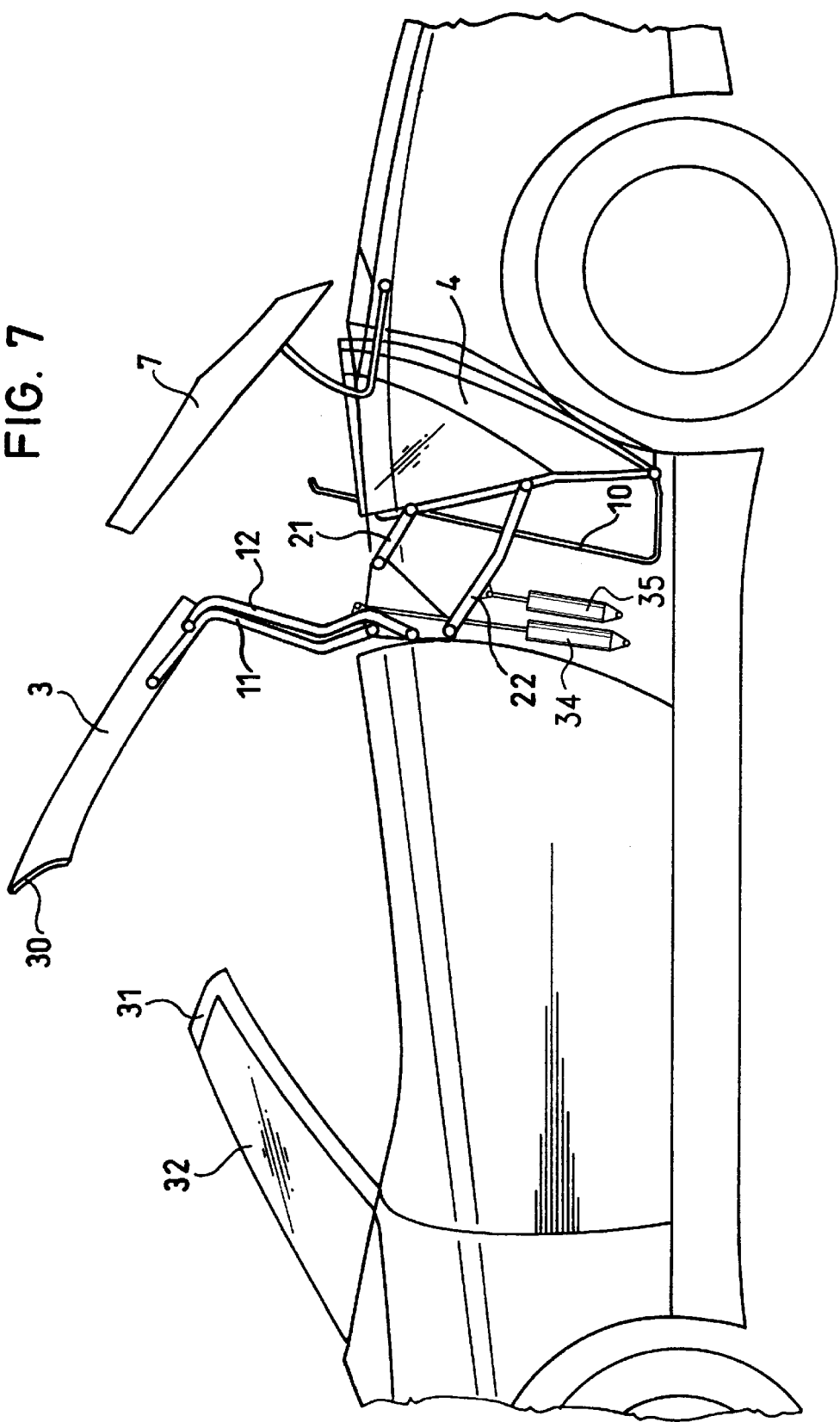
FIG. 7 is a side view of the motor vehicle roof when its front roof element is being deposited in the stowage space for the roof.

To completely open the motor vehicle roof 1, with the cover 7 of the stowage space opened and with the inside cover 10 pivoted forward, the front roof element 3, after it has been released on its front edge 30 from locking engagement on a windshield header 31 above the front window 32, is pivoted via its two levers 11 and 12 to the rear in the direction toward the stowage space 6 (FIG. 7) by a drive, such as by a piston and cylinder unit 34 connected to lever 12 and is lowered therein (FIG. 8) so as to be located roughly in a vertical orientation directly in front of the rear roof element 4. The inside cover 10 is pivoted back again, and with its top edge which extends to the rear and with the cover 7 of the stowage space swung down again, it covers the deposited motor vehicle roof (roof element 3 and rear element 4). Thus, the vehicle roof 1 of the convertible automobile 2 is in its fully open position.

When the inside cover 10 is made flexible, for example, as a rigid frame with a flexible covering, when the motor vehicle roof is closed, a cargo space 33 (shown schematically in FIG. 1 by the dashed line) can be widened/expanded into the stowage space 6 for the roof elements behind the seats.

What is claimed is:

1. Convertible hard-top motor vehicle roof comprising a rigid front roof element and a rigid rear roof element, each of which is supported to pivot on a body of the motor vehicle by a respective lever arrangement for movement between a closed position over a vehicle passenger space and a lowered position deposited in a stowage space which is covered by a swingable cover; wherein the front roof element and the rear roof element are essentially in a vertical arrangement in the lowered position in the stowage space; wherein the stowage space for the roof elements is located behind seats of the motor vehicle and is bounded forwardly towards the seats by a pivoting inside cover.

2. Motor vehicle roof as claimed in claim 1, wherein the rear roof element is movable into the stowage space while the front roof element remains in its closed position.

3. Motor vehicle roof as claimed in claim 1, wherein the cover of the stowage space is pivotally mounted on the body so as to be upwardly swingable from a closed position covering the stowage space while the rear roof element remains in its closed position.

4. Motor vehicle roof as claimed in claim 1, wherein the lever arrangement which supports the front roof element comprises two rods which form a four-bar mechanism.

5. Motor vehicle roof as claimed in claim 4, wherein the lever arrangement which supports the rear roof element has two rods which form a four-bar mechanism.

6. Motor vehicle roof as claimed in claim 1, wherein the lever arrangement which supports the rear roof element has two rods which form a four-bar mechanism.

7. Motor vehicle roof as claimed in claim 1, wherein, with the roof elements in the closed position, the lever arrangement extends essentially vertically, roughly in an area of a side front edge of the rear element.

8. Motor vehicle roof as claimed in claim 1, wherein a cargo space is provided between the seats and said stowage space.

9. Motor vehicle roof as claimed in claim 8, wherein the inside cover is at least partially flexible.

10. Motor vehicle roof as claimed in claim 1, wherein the lever arrangements are constructed and arranged such that, to completely open the motor vehicle roof, after swinging the cover of the stowage space up and pivoting the inside cover forward, first the rear roof element and then the front roof element are deposited in the stowage space.

11. Motor vehicle roof as claimed in claim 1, wherein the front roof element and the rear roof element each has its own drive.

12. Motor vehicle roof as claimed in claim 1, wherein the lever arrangements are pivotally connected to the body of the motor vehicle on a bearing plate.

13. Motor vehicle roof as claimed in claim 1, wherein the rear roof element comprises a roof panel and side windows which are movable together as a unit into said stowage space.

* * * * *